G. J. WALDREP.
FLOAT CONTROLLED LIQUID GAGING AND CUT-OFF MEANS.
APPLICATION FILED AUG. 4, 1919.
1,344,663.
Patented June 29, 1920.
2 SHEETS—SHEET 2.
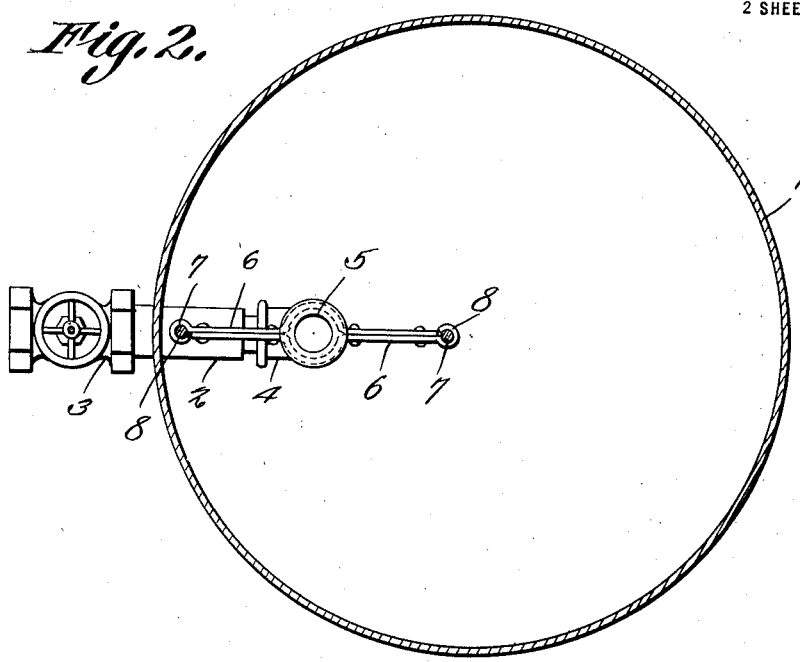
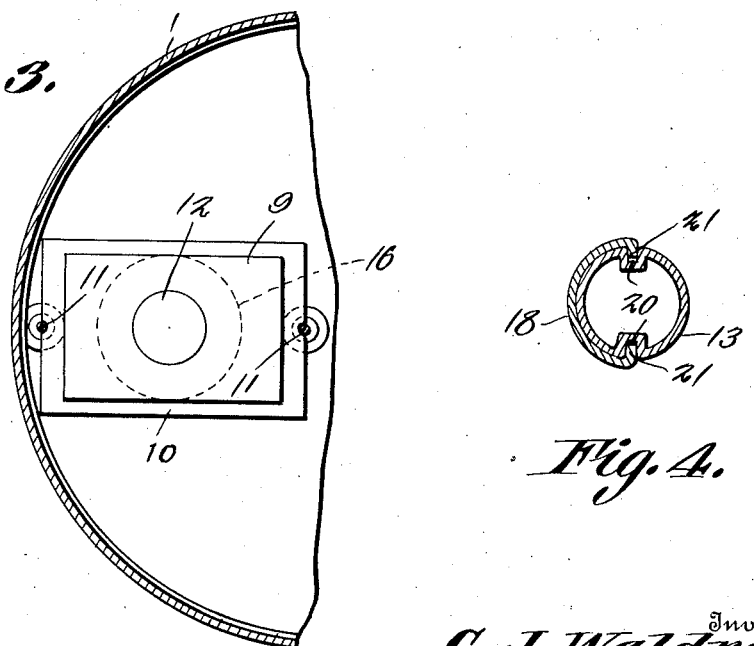

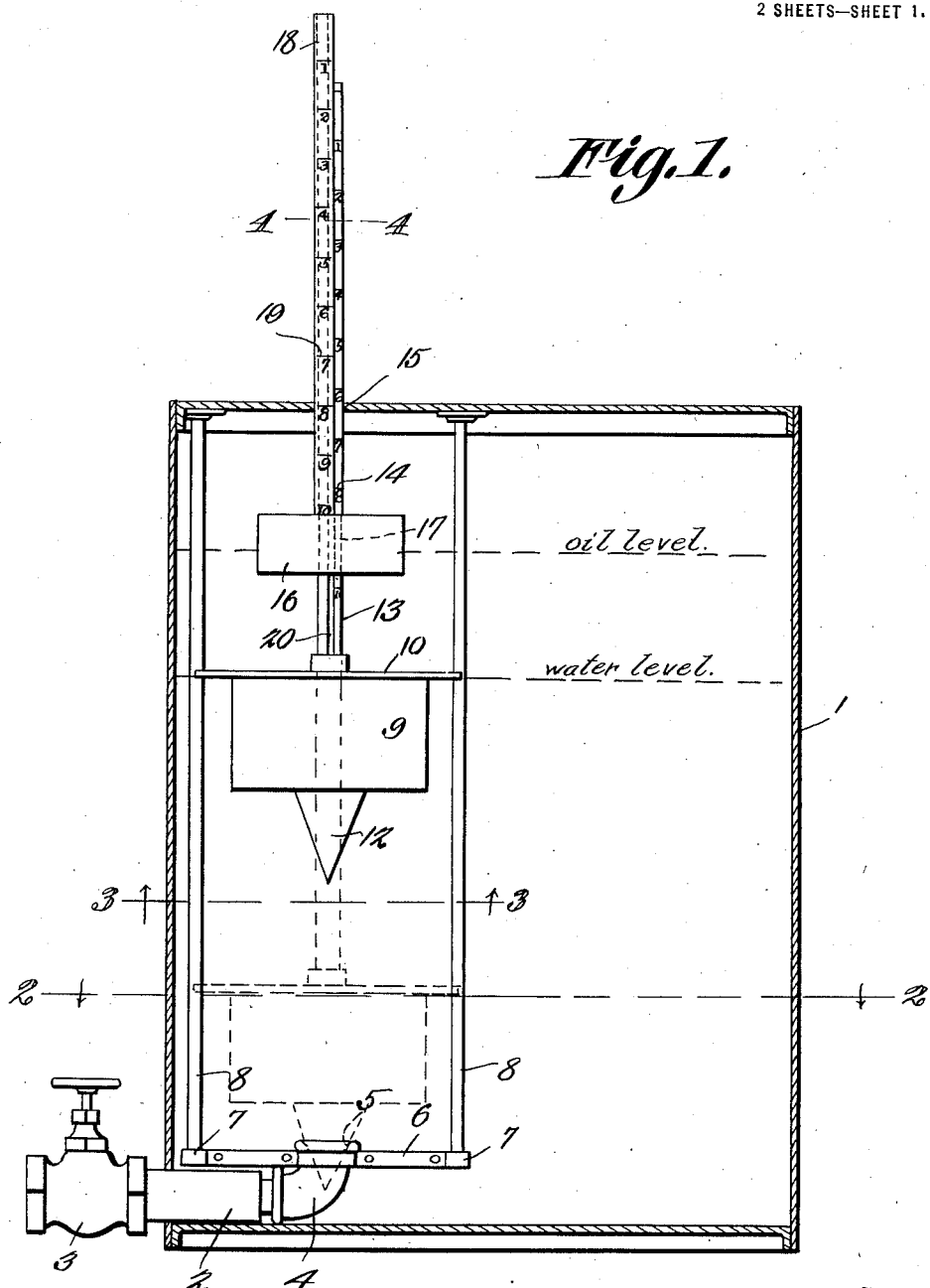

UNITED STATES PATENT OFFICE.

GRANVILLE J. WALDREP, OF FANNETT, TEXAS.

FLOAT-CONTROLLED LIQUID-GAGING AND CUT-OFF MEANS.

1,344,663. Specification of Letters Patent. Patented June 29, 1920.

Application filed August 4, 1919. Serial No. 315,158.

*To all whom it may concern:*

Be it known that I, GRANVILLE J. WALDREP, a citizen of the United States, residing at Fannett, in the county of Jefferson and State of Texas, have invented a new and useful Float-Controlled Liquid-Gaging and Cut-Off Means, of which the following is a specification.

This invention relates to an automatic cut off device for oil tanks, and has for its object the provision of a device for indicating the amount of water that accumulates in an oil tank and that will automatically close a discharge opening when all the water has been discharged from the tank.

A further object is the novel form and arrangement of valve, valve guide and indicating mechanism.

Other objects will present themselves, as the description proceeds, the invention residing in the novel combination and arrangement of parts to be further described and claimed, it being understood that slight changes may be made within the scope of what is claimed, without departing from the spirit or sacrificing any of the advantages of the invention.

In the drawing forming a part of this invention:

Figure 1 is a vertical section of the device there being parts shown in elevation.

Fig. 2 is a sectional plan view on line 2—2 of Fig. 1.

Fig. 3 is a detail section on line 3—3 of Fig. 1.

Fig. 4 is a detail section on line 4—4 of Fig. 1.

Referring to the drawing, there is shown at 1 a tank of ordinary construction, having a drain outlet 2, which is provided with a valve 3. Secured to the outlet pipe 2, within the tank is an elbow 4, the open end of which is upturned and shaped to form a valve seat 5.

A pair of bars 6 are clamped or otherwise secured to the upstanding neck of the elbow 4, and are provided at opposite ends with sockets 7 to receive the lower ends of guide rods 8; the said rods extend to the top of the tank and are secured thereto. A float 9, properly weighted to float on the water in the tank and not be floated by oil on top of the water, is mounted between the guide rods 8. A top plate 10 secured to the float projects over the sides thereof and has formed therein notches 11 which engage the rods 8 to guide the float as it rises and falls in the tank. Secured to the bottom of the float is a cone shaped valve closure 12 adapted to rest in the valve seat 5 and shut off the discharge of water from the tank, when the float drops to the level shown in dotted lines.

An indicator 13 secured to the float 9 moves through an opening 15 in the top of the tank and is provided with graduations 14, which indicate, when compared with the top of the tank, the height of water in the tank.

A second float 16 has an opening 17 through which the stem 13 passes; the float 16 is adapted to rest on the oil and has a stem 18 provided with graduations 19 which being visible above the top of the tank mark the height of oil in the tank. The stem 13 is provided with a longitudinal groove 20 on either side, into which projects a rib 21, formed on the stem 18. This arrangement prevents relative rotary movement between the two stems, and prevents the graduations on the stem 13 being covered by the stem 18.

In use, an observation of the indicators will be possible at any time and will indicate to an operator when an excessive amount of water accumulates in the tank, whereupon the valve 3 may be opened and the water withdrawn, the float following the level of the water until the cone 12 seats in the valve seat 5 and automatically checks the discharge.

The present invention has been found in practical use, to provide a simple and efficient device for separating water from the oil after pumping from an oil well.

The interengaging feature of the float stems, together with the guide members prevent any rotative movement of the stems, so that an operator may always inspect the indices from a given point. The guide also serves to properly seat the valve closure, the cone shape of the closure further insuring proper seating.

Having thus described the invention, what is claimed is:—

1. In a device of the class described, a tank having an outlet provided with a valve seat, a float adapted to be floated by liquid of given specific gravity and having a valve closure for closing the valve seat when the said liquid is discharged from the tank, and a second float adapted to be floated by liquid of less specific gravity than the first mentioned liquid and means provided for each of the floats whereby relative height of the liquids in the tank is indicated.

2. In a device of the class described, a tank having an outlet forming a valve seat, a float adapted to be floated by liquid of given specific gravity and having a valve closure adapted to close the valve seat, a stem carried by the float and a second float adapted to be floated by liquid of less specific gravity than the first mentioned liquid and provided with a stem, the two stems having interengaging elements to prevent relative rotative movement and provided with graduations to indicate the height of the liquids in the tank.

3. In a device of the class described, a tank having an outlet forming a valve seat, a float adapted for suspension between two liquids of different specific gravities in the tank and having a valve closure comprising a cone shaped projection adapted to enter the valve seat, a second float adapted to be floated on the upper liquid, a stem for each of the floats, interengaging elements for the stems to prevent relative rotative movement of the same and a guide for the first mentioned float.

In testimony that I claim the foregoing as my own I have hereto affixed my signature in the presence of two witnesses.

GRANVILLE J. WALDREP.

Witnesses:
B. J. WADE,
F. P. DAVIS.